Aug. 2, 1927.

F. C. ALLEN 1,637,759

BORING MACHINE

Filed Nov. 2, 1922    5 Sheets-Sheet 3

INVENTOR.
Frederick C. Allen
BY Wayne B Wells
ATTORNEYS.

Aug. 2, 1927.

F. C. ALLEN 1,637,759

BORING MACHINE

Filed Nov. 2, 1922

INVENTOR.
Frederick C. Allen
BY Wayne B Wells
ATTORNEYS.

Aug. 2, 1927.

F. C. ALLEN 1,637,759

BORING MACHINE

Filed Nov. 2, 1922      5 Sheets-Sheet 5

INVENTOR.
Frederick C. Allen
BY Wayne B Wells.
ATTORNEYS.

Patented Aug. 2, 1927.

1,637,759

UNITED STATES PATENT OFFICE.

FREDERICK C. ALLEN, OF HARTFORD, CONNECTICUT, ASSIGNOR TO PRATT & WHITNEY COMPANY, OF NEW YORK, N. Y., A CORPORATION OF NEW JERSEY.

BORING MACHINE.

Application filed November 2, 1922. Serial No. 598,588.

My invention relates to machine tools and particularly to precision boring machines.

One object of my invention is to provide a precision boring or drilling machine that shall be provided with means comprising a micrometer head for measuring the movement of the table on the machine and locking means for holding the micrometer head in any set position.

Another object of my invention is to provide a boring machine of the above indicated character that shall be provided with an adjustable bracket mounted on the tool head for guiding the boring bar and that shall be provided with sets of change gears operatively connected to the boring spindle and mounted above the tool head on the column which supports the tool head.

The machine described in this application is an improvement on the machine disclosed in the patent to Hanson, 1,323,267 dated December 2, 1919. The bed of the machine is provided with guides upon which a carriage is mounted. The carriage supports a work table which is movable perpendicularly to the direction of movement of the carriage. A column extends upwardly from the bed of the machine and carries a tool head above the work table. Sets of change gears are mounted on the column above the tool head and serve not only to control the speed of the boring spindle mounted on the tool head but also to control the direction and rate of feed thereof.

The tool head, which is mounted on the column and carries the boring spindle, is provided with a bracket which serves to guide the boring bar near the lower end thereof. The guide bracket is adjustably connected to the tool head and is provided with bushings for adapting it to guide boring bars of various sizes.

Suitable means are provided for moving the carriage relative to the bed of the machine and also for moving the work table relative to the carriage. Moreover, mechanism is provided for accurately measuring the movement either of the carriage relative to the bed or of the work table relative to the carriage. Such means are preferably similar to the means disclosed in the patent to Hanson above referred to. Adjacent to the means for moving the carriage is located mechanism for accurately measuring such movement. Such mechanism preferably comprises a micrometer head and a supplemental dial indicator of the type disclosed in the patent to Hanson. The measuring mechanism is mounted on a bracket which is separate and independent of the bracket which supports the means for moving the carriage. The micrometer head is provided with a locking means for holding it in any position to which it has been set.

Referring to the drawings, the machine is provided with a bed 1 having a column 2 extending upwardly therefrom. The bed 1 is provided with suitable guideways 3 on which a carriage 4 is mounted. The carriage 4 is provided with guideways 5 on which a table 6 is mounted. The guideways on the bed and the carriage are so arranged that the carriage and table may have movement perpendicularly to each other. The table 6 is provided with suitable T-slots 7 for securing the work to be operated upon. Moreover, the table, if so desired, may be provided with supplemental supports, such as are disclosed in the patent to Hanson referred to above.

The column 2 is provided with suitable guideways on which the tool head 9 is mounted. The tool head carries a boring spindle 8 which is secured in a sleeve 11. A boring bar 10 is secured to the spindle 8. The sleeve 11 is provided with suitable bearings 12 and 13 in the tool head 9. Suitable means, preferably comprising a rack and pinion, is provided for effecting movement of the tool head along the column 2. Inasmuch as my invention does not particularly relate to such mechanism, no detailed description or illustration of the same has been made. However, a hand wheel 14 is illustrated for effecting movement of the tool head 9 relative to the column 2.

The boring spindle 8 is raised and lowered relative to the tool head 9 in any suitable manner and a detailed description and illustration of the same is deemed unnecessary. A hand wheel 15 is shown for effecting adjustment of the boring spindle relative to the tool head and a second hand wheel 16 is illustrated for effecting feeding movements of the boring spindle. Other suitable and automatic means, which will be described later, are provided for effecting feeding movements of the boring spindle.

A counterweight 17 is connected to the spindle by means of a chain 18. The chain 18 is shown passing over suitable pulleys 19 and 20. A second counterweight 21 is connected to the tool head 9 by means of chains 22. The chains 22 pass over pulleys 23 and 24. The tool head, when adjusted to any suitable position by means of the hand wheel 14, is locked in such position by means of bolts 25.

A supplemental supporting or guiding bracket 26 is provided for guiding the boring bar 10. Such bracket is attached to two rods 27 and 28 in any suitable manner as by means of the clamping bolts 29 and 30. The two rods 27 and 28 are secured to the tool head 9 in any suitable manner as by means of the clamping bolts 31 and 32. The supplemental bracket carries a suitable bushing 33 which is fitted to the boring bar being used on the machine. The bushing 33 used in the bracket may be changed in accordance with the size of the boring bar or drill being used. By means of such bracket the boring bar or drill is guided adjacent to the work being operated on.

Attention is called to the fact that the supplemental bracket is not directly mounted on the column 2 as has been done heretofore but is mounted on and movable with the tool head 9. Moreover, attention is called to the means provided for adjusting the supplemental bracket with respect to the tool head. For further description and illustration of the mounting of the bushing 33 in the bracket 26, attention is called to the patent to Hanson.

A suitable gear box 34, which is mounted on top of the column 2, carries change gears for operating the boring spindle 8 and for effecting automatic feeding of the boring spindle. A power shaft 35, which projects into such gear box 34, is provided with suitable bearings 36 and 37 inside the box and a bearing in a bracket 38. The bracket 38 is supported on one side of the box. Two pulleys 39 and 40 are mounted on the shaft adjacent to the bracket 38. The pulley 39 is fixedly mounted on the shaft whereas the pulley 40 is loosely mounted thereon. A belt (not shown), which is adapted to operate on the pulleys 39 and 40, is controlled by a belt shifting lever 41. The lever 41 is pivotally mounted on the bracket 38 and is operated by a hand lever 42 which is secured to a shaft 43 on the bracket 38. The shaft 43 is directly connected to the belt shifting lever 41 by means of a link 44 and a lever 45. The hand lever 42 and the lever 45 are mounted on opposite ends of the shaft 43. The bracket 38 is secured to the side of the gear box 34 in any suitable manner as by means of the screws 46.

A pinion 47, which is fixedly mounted on the power shaft 35 between the bearings 36 and 37, meshes with a gear wheel 48 which is mounted on a shaft 49. The shaft 49 is provided with suitable bearings 50 in the gear box 34 and carries two pinions 51 and 52, which are fixedly mounted thereon. A hub 53, which extends from the pinion 52, is provided with a collar 54. A yoke member 55, which is fitted to the collar 54, is mounted on a shaft 56. The shaft 56 is operated by a hand lever 57. Thus, by means of the hand lever 57, the pinions 51 and 52 and the shaft 49 may be shifted for varying the speed of the boring bar 10 in a manner to be hereinafter set forth. The gear wheel 48 is keyed to the shaft 49 but does not follow the axial or longitudinal movement of such shaft when operated by the hand lever 57.

A cone of gear wheels 60 is mounted on a shaft 61 which is located adjacent to the shaft 49. The cone of gear wheels 60 mesh with a second cone of gear wheels 62 which is mounted on a tubular shaft 63. In one position of the hand lever 57 the pinion 52 is in mesh with the smallest one of the gear wheels 60 and in the other position of the hand lever 57 the pinion 51 is in mesh with the largest gear wheel 60.

Figure 1:
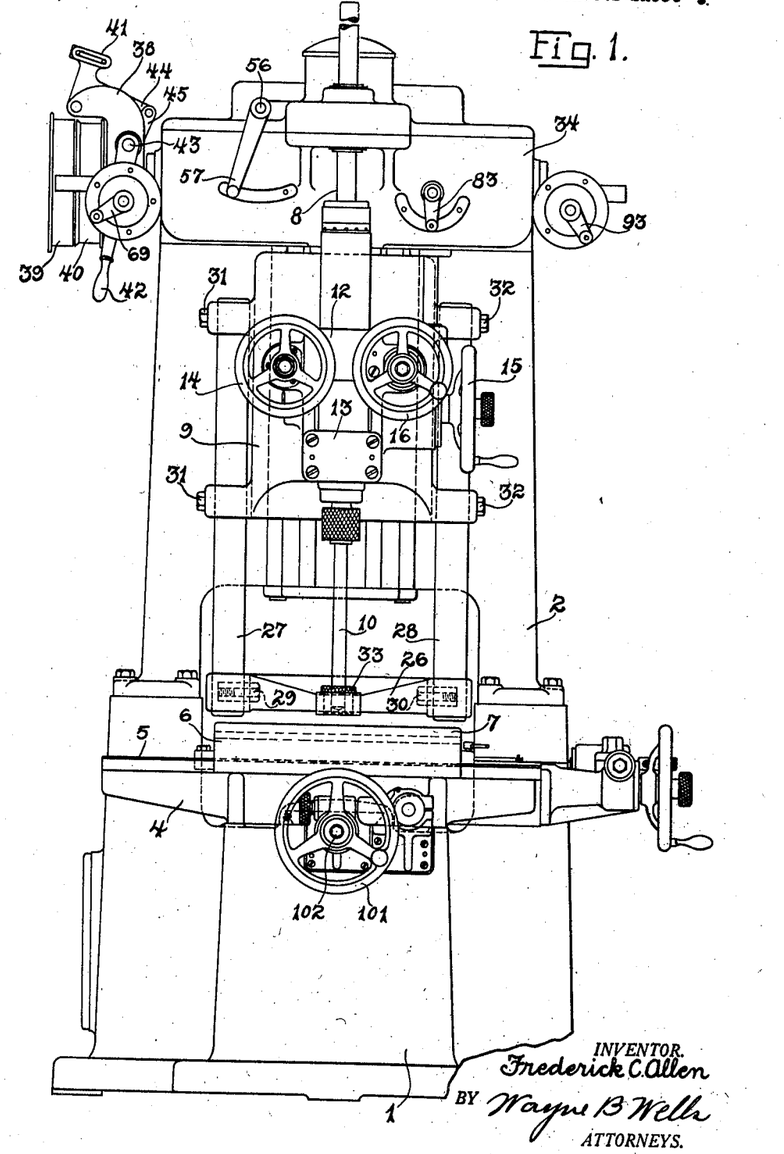
Figure 1 is a front elevational view of a machine embodying my invention.
Figure 2:
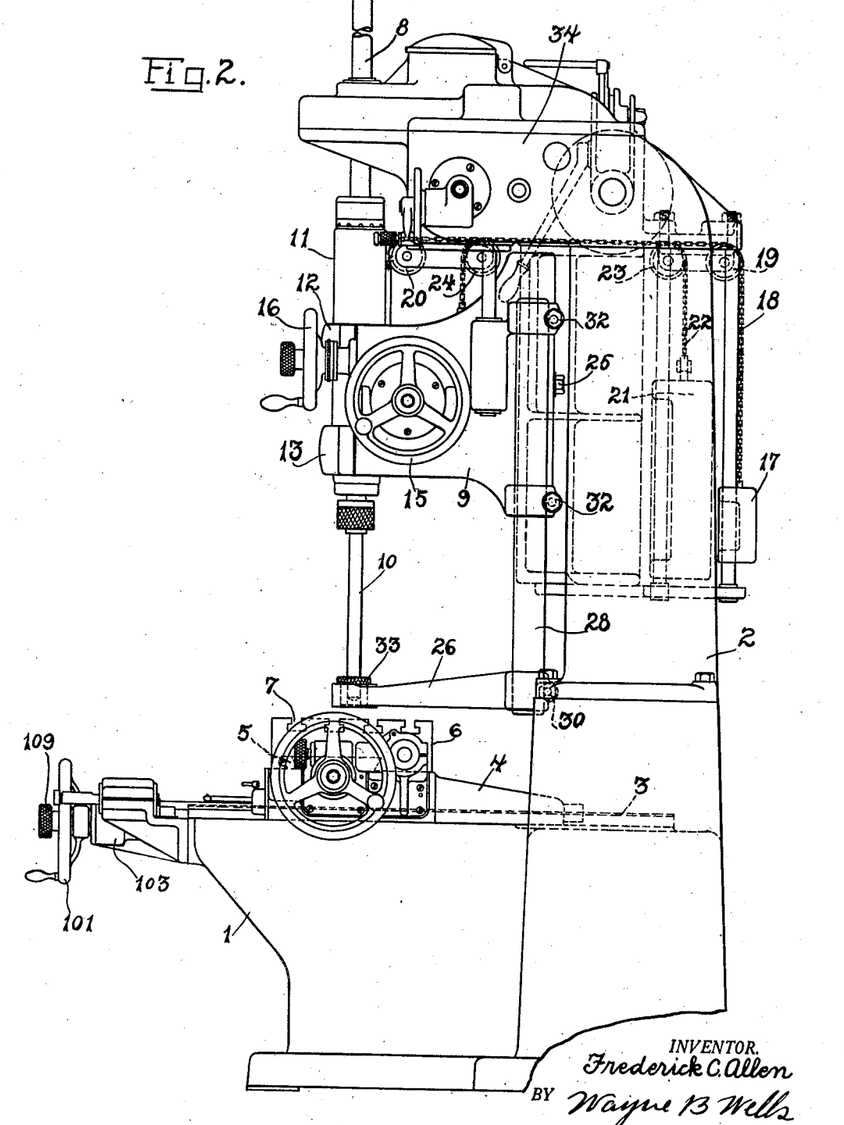
Fig. 2 is a side elevational view of the machine shown in Fig. 1.
Figure 3:
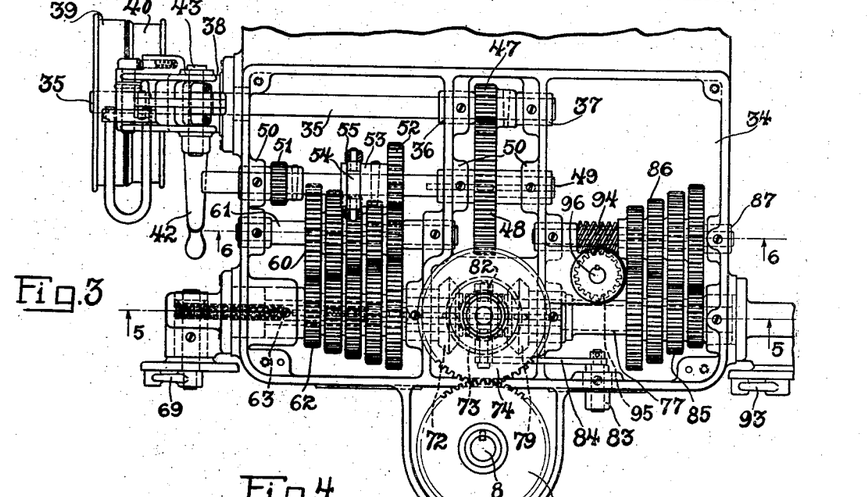
Fig. 3 is a plan view of the gearing system connected to the boring spindle.
Figure 4:
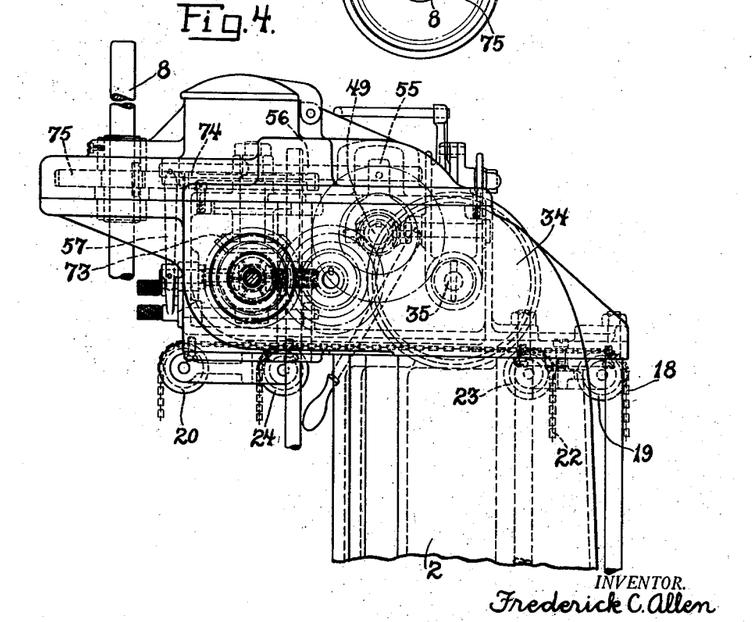
Fig. 4 is a side elevational view of the gearing system shown in Fig. 3.
Figure 5:
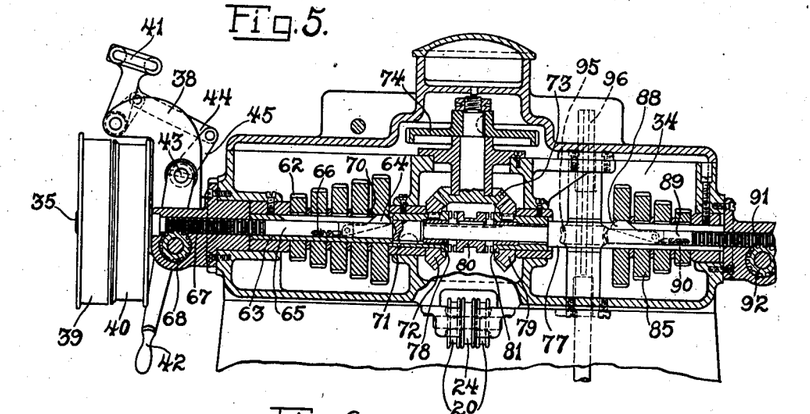
Fig. 5 is a sectional view along the line 5—5 of Fig. 3.
Figure 6:
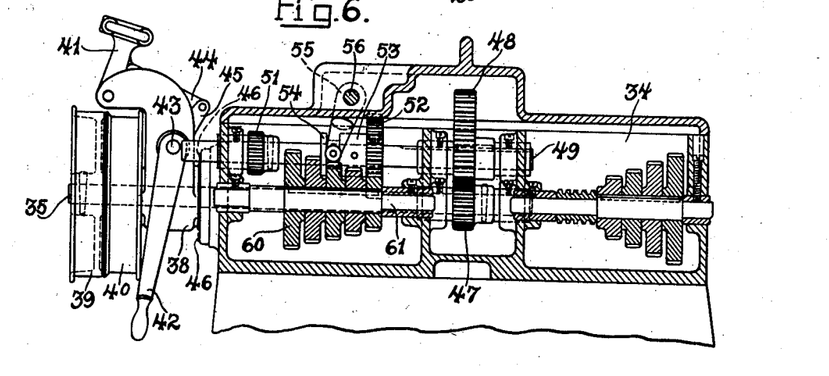
Fig. 6 is a sectional view along the line 6—6 in Fig. 3.

The gear wheels 60 are fixedly mounted on the shaft 61 whereas the gear wheels 62 are loosely mounted on the shaft 63. However, a slidable key member 64 is provided for selectively connecting the gear wheels 62 to the shaft 63. Such key member 64 is pivotally mounted within a slot formed in a rod 65. The rod 65 is positioned in the tubular shaft 63, as shown in Fig. 5 of the drawings. A suitable spring member 66 is provided for resiliently holding the key member 64 in engagement with the selected gear wheel. A cylindrical rack 67, which is formed on the rod 65, meshes with a rack pinion 68. The rack pinion 68 is operated by a suitable hand lever 69, as shown in Fig. 1 of the drawings. Thus, by moving a hand lever 69 to one of the five different indicated positions, the key member 64 may be selectively moved into engagement with one of the gear wheels 62. Separating disks or washers 70, which are provided between the various gear wheels, serve to force the key member 64 into the slot in the rod 65 when moving such key member from engagement with one gear wheel into engagement with another gear wheel. Preferably, a number of keyways are cut in each of the gear wheels 62 whereby little movement of the gearing system will be effected before the key member enters one of the keyways in a selected gear wheel.

The tubular shaft 63 extends into and is keyed to a bushing 71, as shown in Fig. 5 of the drawings. The bushing 71 is keyed to a bevel gear wheel 72. The bevel gear wheel 72 meshes with a second bevel gear wheel 73 which is connected in any suitable manner to a gear wheel 74. The gear wheel 74 meshes with a gear wheel 75 which is directly connected to the boring spindle 8. The gear wheel 75 is keyed to the boring spindle 8 but is slidably mounted thereon in order to permit axial movement by the spindle relative to the gear wheel. Thus, the boring spindle is operated by the pulley 39 through the power shaft 35, gear wheels 47 and 48, shaft 49, gear wheels 60 and 62, the bevel gear wheels 72 and 73, and the gear wheels 74 and 75. Two changes in speed of the boring spindle 8 may be effected by operating the hand lever 57 and five changes in speed may be effected by the hand lever 69 for each position of the hand lever 57.

A shaft 77, which is aligned with the tubular shaft 63, projects into the bevel gear wheel 72 and is supported thereon by means of a bushing 78. The shaft 77 also has suitable bearings in the gear box 34. A bevel gear wheel 79, which is rotatably mounted on the shaft 77, meshes with the bevel gear wheel 73. A clutch member 80 is keyed to and slidably mounted on the shaft 77 between the bevel pinions 72 and 79. Suitable clutch teeth are mounted on the clutch member 80 and on the bushing 71, which supports the bevel gear wheel 72, whereby the shaft 77 may be fixedly connected to the bevel gear wheel 72 when the clutch member is moved in one direction. The clutch member 80 also carries clutch teeth, which are adapted to engage clutch teeth on the bushing 81 supporting the gear wheel 79. Thus, the direction of rotation of the shaft 77 is controlled by the clutch member 80. The clutch member 80 is operated by a yoke member 82, which is connected to a hand lever 83, by means of a link 84. The hand lever 83 is controlling the direction of rotation of the shaft 77 controls the automatic feeding movements of the boring spindle in a manner to be hereinafter set forth.

The shaft 77 carries a cone of gear wheels 85 which mesh with a second cone of gear wheels 86. The cone of gear wheels 86 is fixedly mounted on a shaft 87. The cone of wheels 85 is loosely mounted on the shaft 77 and is adapted to be selectively connected thereto by means of a key member 88. The key member 88 is pivotally mounted in a slot formed in a rod 89 which is located within the hollow end of the shaft 77. A spring member 90 is provided for resiliently holding the key member 88 in engagement with the selected gear wheel. A cylindrical rack 91, which is formed on the rod 89, meshes with a pinion 92 which is operated by a hand lever 93. Thus, by moving the hand lever 93, the key member 88 may be moved to connect one or the other of the gear wheels fixedly in engagement with the shaft 77.

The shaft 87 carries a worm member 94 which meshes with a worm pinion 95. The worm pinion 95 is keyed to and slidably mounted on a shaft 96 which effects automatic feeding of the boring spindle. A complete description and illustration of the connections of such shaft 96 to the boring spindle is deemed unnecessary.

In the above mechanism, it will be noted all the sets of change gears for controlling the speed of the boring bar, as well as the speed of and the direction of the automatic feed are located in a gear box mounted on top of the column 2 above the tool head.

Inasmuch as the carriage 4 is moved relative to the bed 1 and the table 6 is moved relative to the carriage 4 in exactly the same manner as the carriage and the table are moved in the machine disclosed in the patent to Hanson, a detailed description of such mechanism in this application is deemed unnecessary. Moreover, the means for moving the carriage relative to the bed is substantially the same as the means for moving the table relative to the carriage. The means for measuring the movement of the carriage relative to the bed and the means for measuring the movement of the table relative to the carriage as shown in this application are substantially the same as the mechanism disclosed in the above mentioned patent to Hanson with the exception of the improved means which is provided for locking the micrometer head in any set position. Accordingly, only means for moving the carriage relative to the bed will be disclosed briefly and the means for locking the micrometer head in the measuring mechanism.

Figures 7, 8, 9, 10, 11:
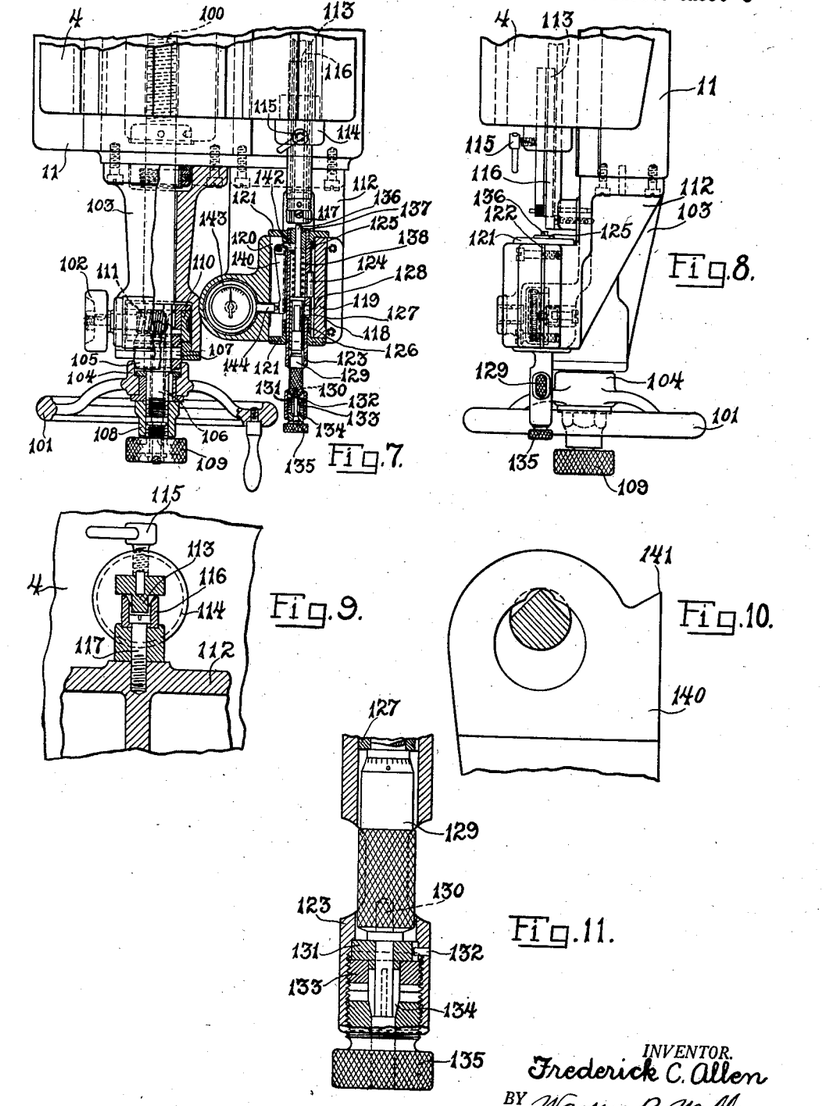
Fig. 7 is a horizontal sectional view showing the devices for moving the carriage and for measuring the amount of movement.
Fig. 8 is a side elevational view of the mechanism shown in Fig. 7.
Fig. 9 is a detail view of the measuring rod support.
Fig. 10 is a detail view of the lever for operating the dial indicator.
Fig. 11 is a detail view of the micrometer locking mechanism.

A screw shaft 100 is provided for effecting movement of the carriage 4 relative to the bed 1, as shown in Fig. 7 of the drawings. Such shaft 100 is adapted to be operated by a hand wheel 101 for effecting a rapid and coarse adjustment of the carriage. The shaft 100 is operated by a knob 102 to effect a finer and a more accurate adjustment of the carriage. The shaft 100 projects through a bracket 103 which is mounted on the bed of the machine in any suitable manner. The bracket 103 not only serves as a bearing for the shaft 100 but also supports the mechanism for adjusting the screw shaft. The hand wheel 101 is not directly connected to the screw shaft 100 but is so mounted as to be capable of rotation independent thereof. A flange 104 is formed on the hub of the wheel and is provided with a conical bore. A sleeve or collar member 105 is mounted on the shaft 100 adjacent to the hand wheel and is provided with a conical surface adapted to engage the conical surface on the hand wheel. A rod 106, which is movable longitudinally in a central aperture in the shaft 100, is connected with the collar member 105 by means of a key member 107. The key extends through a slot in the shaft 100 which is long enough to permit free movement thereof. Near the end of the screw shaft 100 beyond the hand wheel 101 is a collar member 108. The collar member has threaded engagement with the hub of a knob 109 which is connected with the rod 106. Thus, by turning the knob 109, the rod 106 can be moved longitudinally to bring the collar 105 into or out of engagement with the hand wheel and accordingly to connect the hand wheel with the shaft 100 or disconnect it therefrom.

A worm wheel 110 is loosely mounted on the shaft 100 adjacent to the collar member 105. The worm wheel meshes with a worm member 111 which is rotatably mounted in the bracket 103. The knob 102, before mentioned, is provided for operating the worm member 111. The worm wheel 110 is provided with a conical surface which is adapted to be engaged by a second conical surface on the collar member 105. As already described, the collar member 105 is moved in one direction to connect the hand wheel 101 with the screw shaft 100 but when the collar is moved in the opposite direction, it not only disengages the hand wheel from the shaft but also connects the worm wheel 110 to the shaft 100 whereby the shaft 100 is turned by means of the knob 102 acting through the worm 111. Thus, it is apparent for rapid movement of the carriage, the screw 100 may be turned by means of the hand wheel 101 and that if a very slow or limited movement of the shaft 100 is desired, the screw 100 may be turned by means of the knob 102. When the collar 105 is in an intermediate position, the hand wheel and the worm wheel are both disconnected from the shaft 100 and any accidental or inadvertent movement thereof is prevented. For a more complete and detailed description of the means for moving the carriage, reference may be had to the above mentioned patent to Hanson.

A bracket 112 is mounted on the bed of the machine adjacent to the bracket 103 and independent thereof. The bracket 112 serves to support the mechanism for measuring the movement of the carriage relative to the bed of the machine. Attention is called to the fact that the means for supporting the measuring mechanism on the machine disclosed in the application is different from the mechanism for supporting the measuring mechanism which is disclosed in the patent to Hanson. In the Hanson patent, the table moving bracket and the measuring mechanism bracket are integral. In the machine disclosed in the application two brackets are provided. A measuring rod 113 is slidably mounted in a bearing bushing 114 which is carried by the carriage. After the rod has been adjusted to any set position, it can be clamped by means of a set screw 115. A suitable channel-shaped support 116 is provided for the rod 113 in the mechanism disclosed. In the patent to Hanson it will be noted two rails are provided in place of a single channel-shaped support as is disclosed in the present machine. The channel-shaped support extends through the bushing 114 and is held against longitudinal movement by any suitable means as by a screw 117. If so desired a number of end measures may be placed in engagement with the end of the rod in the same manner as disclosed in the above mentioned patent to Hanson.

The bracket 112 is enlarged and recessed to provide a cylindrical chamber 118 having its axis in exact alignment with the axis of the rod 113. A bushing 119, which is slotted at 120 for a purpose to be hereinafter set forth, is mounted in the chamber 118. Shouldered washers 121 are fitted to the ends of the bushings 119. The bracket 112 is slotted at 122 on one side of the bushing 119, as shown in Fig. 8 of the drawings, and clamping screws are provided whereby the bushing may be securely held in position. The shoulders on the washer members 121 prevent the bushing from being contracted. Preferably, in order to prevent any possible contraction of the bushing at the center where it is not directly supported by the washers, the walls of the chamber are cut away as indicated by the drawings.

An elongated sleeve or casing 123 is slidably mounted in the central aperture of the washer members 121. The sleeve 123 is held against rotative movement by means of a key member 124 which engages a longitudinal keyway in the bushing 119. Suitable means, such as a shoulder on the bushing 119, is provided for cooperating with a flange 125 on the sleeve 123 to limit the longitudinal movement thereof. The axial or longitudinal movement by the sleeve 123 is very small and in practice is preferably limited to exactly one one-hundredth of an inch. The sleeve 123 is held in its forward position by means of a coiled spring 126.

A tube 127, which is mounted in the sleeve 123, is held against rotative movement by means of a key member 128. The tube 127 is fitted to the body of a micrometer head 129. The micrometer head may be of standard dimension and accordingly it is considered unnecessary to describe it in detail. The casing or sleeve 123 is cut away to permit the micrometer barrel to be turned and also to enable the micrometer readings to be observed.

A pin 130, which is mounted on the outer end of the micrometer barrel, projects through a chuck member 131 which is mounted in the sleeve 123 adjacent to the end of the barrel of the micrometer. Any suitable means such as a pin 132 projecting through the sleeve 123 is provided for preventing any rotative movement of the chuck member 131. A locking nut 133 is provided for firmly holding the chuck member in engagement with a shoulder on the sleeve 123 adjacent to the end of the micrometer. The chuck member is provided with suitable prongs 134, which surround the pin 130 and have bevelled ends. The bevelled ends are adapted to be engaged by a conical surface on a nut 135 which is threadedly connected to the end of the sleeve 123. Thus, when the nut 135 is screwed into the sleeve 123, the prongs on the ends of the chuck member are wedged into engagement with the pin 130 on the end of the micrometer. In such manner the micrometer is fixedly connected to the sleeve 123 and further movement of the micrometer is imposible.

The tube 127 extends beyond the end of the stem of the micrometer head and engages a flange formed on the end of a rod 136. The rod 136 extends through the central opening of a bushing 137 mounted in the casing 123. The rod is normally held in an extreme position with respect to the casing by means of a coiled spring 138. The rod is adapted to cooperate at one end with the measuring rod 113 either directly or indirectly by means of one or more end measures. The rod 136 together with the tube 127 in effect constitutes an extension of the micrometer head. By turning the micrometer barrel, the tube 127 and the rod 136 can be moved relatively to any desired extent as indicated by the micrometer readings. The direct readings of the micrometer head represent the actual movement of the rod toward the work. The micrometer head is graduated so that each division represents one one-thousandth of an inch.

The casing 123 is normally held in one position by means of the spring member 126 which resists any movement in an opposite direction. The spring member serves to cause a uniform predetermined pressure at all points of contact of the measuring rod 113, of the rod 136 and of the end measures if such are used.

When contact is effected, the casing 123 is moved and the spring 126 is compressed. The exact amount of movement is measured in the same manner as is disclosed in the patent to Hanson. The means for measuring such movement consists of a dial test indicator. The dial test indicator is separate from and supplemental to the micrometer head. A lever 140 is positioned in the slot 120 formed in the bushing 119. Such lever is pivotally mounted in any suitable manner and is provided with a knife edge 141 which is adapted to engage with a hardened steel pin 142 fitted in an aperture in the casing 123. The bracket 112 is provided with a recess adapted to receive a dial test indicator 143 which is or may be of standard form. Preferably, the indicator is constructed and graduated so that each division of the dial indicates one one-thousandth of an inch. The indicator 143 is so positioned that the actuating pin 144 is in engagement with one end of the lever 140. The pin 144 contacts with the lever 140 at a point which is at a predetermined distance from the pivot point of the lever, such distance being a definite multiple of the distance from the pivot point to the knife edge 141. Preferably, the ratio is ten to one and by reason of this ratio, a movement of the pointer of the indicator over one dial division indicates a movement of the sleeve or casing 123 one ten-thousandth of an inch. In the patent to Hanson a complete description is given of the operation of the micrometer head and of the dial indicator in measuring the changes in position of the carriage. In view of the complete description in the Hanson patent, it is believed unnecessary to completely describe and set forth the measuring operation in describing the present machine.

Modifications in the machine and in the arrangement and location of parts may be made within the spirit and scope of my invention and such modifications are intended to be covered by the appended claims.

What I claim is:

1. In a boring machine, the combination with a boring spindle rotatable about a fixed axis, and a work table movable transversely of said boring spindle, of a micrometer head for measuring the movement of said table, a casing for supporting said micrometer head, a pin projecting axially from said head, and resilient means retained against rotation and adapted to be forced into contact with said pin for locking said pin to the casing to hold the micrometer in any set position.

2. In a boring machine, the combination with a boring spindle rotatable about a fixed axis, and a work table movable transversely of the spindle, of means for moving said table, a bracket for supporting said table moving means, mechanism independent of said table moving means for measuring the table movement, said mechanism comprising a micrometer head, resilient means retained against rotation and adapted to be forced into contact with a portion rotating with said head for locking the micrometer head against movement when in set position, and a bracket detachably mounted on said machine adjacent to but independent of said table moving bracket for supporting said mechanism.

In testimony whereof, I hereto affix my signature.

FREDERICK C. ALLEN.